Patented Feb. 6, 1923.

1,444,257

UNITED STATES PATENT OFFICE.

LEON LILIENFELD, OF PODHAJCE, POLAND.

PROCESS OF PRODUCING COLLOIDAL SOLUBLE SUBSTANCES AND SUSPENSIONS.

No Drawing. Application filed January 14, 1921. Serial No. 437,320.

*To all whom it may concern:*

Be it known that I, LEON LILIENFELD, a citizen of the Republic of Poland, residing at Podhajce, Poland, have invented certain new and useful Improvements in Processes of Producing Colloidal Soluble Substances and Suspensions (for which I have filed applications in Austria August 1, 1919, and December 21, 1920), of which the following is a specification.

In the production of colloidal soluble materials (metals, metal-oxides and the like) as well as emulsions, albuminous bodies, proteids, products of decomposition of albumen, glutin (gelatine), gum, vegetable mucilage, tragacanth, soaps, nucleinic acid and the like, have until now been employed as the protective colloids. These protective colloids present various defects. Part of them are of an unstable nature, to some the living organism is occasionally super-sensitive, the protective effect of most of them is limited; and the majority exercise a more or less great irritating effect upon the mucous membrane and so on.

The successful application of colloidal-soluble materials which were produced by the aid of the most of the protective colloids hitherto employed as salves for external use, ointments and the like, is to a large degree impaired by the fact that the solutions of these protective colloids due to their brittleness leave behind then not a continuous pliant membrane but rather a more or less brittle residuum.

As the foundation for the present invention there lies the observation that the alkyl- and aralkyl-ethers of cellulose, starches, dextrin and the like, in short, the ethers of the carbohydrates of the type $n\ (C_6H_{10}O_5)$, their conversion products and derivatives, possess a very superior adaptability for use as protective colloids. The protective quality shown by them is extraordinarily effective.

The colloidal solutions, emulsions, or suspensions made by any known process in the presence of solutions of the alkyl- or aralkyl-derivatives of cellulose, starch, dextrin or the like (or in other words, ethers of the polysaccharids) prepared according to any of the processes known at present, display a marked stability and owing to the extraordinary inertness and chemical and physical resistance of the ethers of the carbohydrates used as the protective colloid, and also the derivatives and transformation products of them show no unpleasant secondary effects. As experience teaches, the presence of the ethers of the carbohydrates $n\ (C_6H_{10}O_5)$, increases the effectiveness of the solutions, suspensions or emulsions in a remarkable degree, from which it may be deduced that the ether components along with the colloidally dissolved material develops an effect peculiar to themselves. The solutions and suspensions made according to the present process show as good as no irritation-producing qualities. And so, even in this direction, all the previously known protective colloids are far surpassed by the ethers of cellulose, starch, dextrin and the like.

The bactericidal properties of the colloidal soluble materials or emulsions made according to the present process are excellent. The solutions of the colloidal soluble materials made according to the present process are viscous and on drying leave behind them according to the carbohydrate-ether used, more or less pliant elastic skins, which to the highest degree is true in the case of the alkyl-derivatives of cellulose, or of its derivatives, or conversion products. All these properties give to the solutions of the colloidal soluble materials made according to the present invention great suitability for sub-cutaneous, intra-muscular and intra-venous injections, for the preparation of salves, for internal administration and the like.

The emulsions made in accordance with the present invention possess a much greater effectiveness of the substances emulsified, as camphor, alkaloid-bases and the like, than the known solutions in oils and the like. This great effectiveness is to be ascribed to the much greater effective surface.

It is a known fact that the various alkyl-ethers and aralkyl-ethers of the carbohydrates of the type $n\ (C_6H_{10}O_5)$ have to show different degrees of solubility. According to the kind and number of the alkyl- or aralkyl-groups introduced, many of the ethers of carbohydrates are soluble in water; many are capable of swelling in cold water and are soluble in a relatively small number of organic solvents; many are soluble in an extraordinarily great number of organic solvents. Thus, for example, the ethyl- and methyl-derivatives of lower degrees of alkylation of cellulose, starch, dextrin, lichenin, inulin, and the like are soluble in cold water thereby giving viscous fluids (note for example, U. S. Patents 1,188,376 and 1,350,820). These aqueous solutions usually show the remarkable property of coagulating when the solution is heated. The heat-coagula redissolve in water on cooling. The alkyl derivatives of higher degrees of alkylation are, according to the number and kind of alkyl groups introduced, either insoluble in cold water or only capable of swelling up in it; but, on the other hand, they are soluble in a great number of organic solvents; many of them are soluble in fats and oils.

For making hydrosols of course only the above-mentioned alkyl-derivatives of cellulose, starch, dextrin and the like or their derivatives and conversion products which are soluble in water are suitable. The carbohydrate ethers which are insoluble in water can be used successfully in making organosols.

If one warms or heats the aqueous solutions of the water-soluble alkyl derivatives of the carbohydrates $n$ $(C_6H_{10}O_5)$ (such as water-soluble ethyl- or methyl-cellulose, water-soluble ethyl- or methyl-starch or the like) which contain other colloidal substances in solution or suspension or emulsion, then the alkyl-derivative of the carbohydrate precipitates or coagulates and carries the other colloidal substance along with it. On cooling, surprising to say not only does the alkyl-derivative of the carbohydrate go back into solution, suspension, or emulsion again, but also likewise do the other colloidal substances which were separated with it. Upon this circumstance is based an important technical advance of the present invention. That is to say one is in a position of so proceeding that he warms or heats the colloidal solutions or suspensions or emulsions which (besides the other colloidal substance) contain the water-soluble alkyl-derivatives of cellulose, starch, or dextrin and the like and then, with warm or hot water, washes out the precipitate or coagulum consisting of the alkyl-derivatives of the carbohydrate and of the other colloid substance, whereupon he again dissolves finally in cold water (for which purpose the water clinging to it from the precipitation or an additional quantity of water may be employed), or he dries it. This method of removing impurities or by-products of the reaction which is possible with no other heretofore known protective colloid is considerably more effective and simple than the methods until now used, such as the less effective, troublesome and time-consuming dialysis, and the like.

The colloid solutions or suspensions or emulsions of colloid substances can be produced before the heat-coagulation either in the aqueous solutions of the soluble alkyl-derivatives of the carbohydrates, as cellulose, or starch, dextrin or the like according to any process (reduction, electric dispersion, precipitation, mutual reaction of the components and so on) or one adds them, already dissolved or suspended (in water alone or with any other protective colloid), to the aqueous solutions of alkyl-derivatives of the carbohydrates.

Instead of using the single alkyl- or aralkyl-derivatives as protective colloids by themselves, mixtures of different alkyl-derivatives and aralkyl-derivatives can be used. Further, application can be made of the alkyl-ethers of the carbohydrates of the type $n$ $(C_6H_{10}O_5)$ alone or in mixtures with other protective colloids.

The production of the colloidal soluble materials according to the present process takes place according to any of the known methods. The colloid solutions of the materials in question can be produced in the solutions of the carbohydrate-ethers by reduction, electric dispersion and the like, or the dry colloids concerned either by themselves or in the dissolved state (colloidal metals or metal oxides and the like, rubber, dextrin, albumin, molybdic acid, tungsten blue and the like) can be brought together with the solutions of the carbohydrate-ethers.

For making emulsions the aqueous solutions of the soluble alkyl-derivatives of cellulose, starch, dextrin and the like or their derivatives or conversion products are ground with the finely divided solid or oily suspended materials or emulsified according to some other known process. Disinfecting materials such as phenols and the like or medicinal substances and the like so far as they are oily can be dissolved in the suspended materials. In this case the ethers of the carbohydrates act as binding materials or protective colloids not only for the emulsified oils but also for the disinfecting, medicinal or cosmetic materials dissolved in these oils.

*Examples.*

I. 200 parts by weight of 5–10% solution of ethyl- or methyl-cellulose or ethyl- or methyl-starch soluble in water are mixed with a solution of 5 to 7 parts by weight of silver nitrate in 5 to 7 parts by weight of water. Then 250 parts by weight of a 10% ammonia solution and 200 to 250 parts by weight of a 6–8% ammonium-formate solution are combined and the mixture heated for a considerable time. It is then cooled during which any coagulate which may have formed goes into solution, the solution is then dialysed and is either evaporated in vacuum or under atmospheric pressure or precipitated with alcohol or alcohol-ether mixture or acetone or the like and the precipitated hydrosol dried.

II. 15 parts by weight of an ethyl-ether of cellulose or starch soluble in cold water are dissolved in 300–500 parts by weight of water in a mortar. Then 5–8 parts by weight of solid pyrogallol are added and kneaded with the solution. To this mass is then added a drop at a time, a solution of 15–16 g. mercury chloride in 200 g. of water, accompanied by continuous stirring. The colloidal solution resulting, is now mixed with alcohol until a precipitate is produced. Then 5–10 g. of caustic soda, dissolved in a little water are added, the precipitate brought to the filter, washed with alcohol in the filter or by decantation until the alcohol shows a neutral reaction with phenol-phtalein and then either immediately or after a preliminary treatment with ether is dried. There results a black-brown, solid body which dissolves in water to a dark brown solution. The mercury content of the solid body amounts to 26%.

III. 30 parts by weight of an ethyl-cellulose or ethyl-starch soluble in water are dissolved in 500 g. of water, and mixed with 5–9 g. of caustic soda dissolved in a little water. To this mixture are added 15 parts by weight of sublimate (mercuric chlorid) dissolved in water. There is produced an egg-yellow solution or emulsion which combined with considerable alcohol gives an egg-yellow, flocculent precipitate. This precipitate, as in the previous example is washed with alcohol and then dried. It produces a bright brown, solid body with a mercury content of 30%.

IV. 500–1000 parts by weight of a 5–10% aqueous solution of a water-soluble ethyl- or methyl-cellulose or an ethyl- or methyl-starch are beaten up, rubbed up or agitated with 200 parts by weight of an oil as poppy seed oil, linseed oil, or sesame oil. There is produced an emulsion. Or the solution of the ether is rubbed up with a suitable coloring powder or with metallic mercury or the like to the finest degree of division.

V. 70 parts by weight of a 5% solution of an ethyl-cellulose soluble in a fat, or an ethyl-starch or a benzyl-cellulose or benzyl-starch soluble in an oil, for example, poppy seed oil, castor oil, olive oil or the like are triturated most thoroughly in a mortar with 30 parts by weight of an aqueous solution of an ethyl-cellulose or ethyl-starch soluble in water. A salve like emulsion is produced.

VI. 50 parts by weight of phenol or cresol are dissolved in 500 parts by weight of an oil and this solution is emulsified with 500–1000 parts by weight of a 5–10% aqueous solution of an ethyl- or methyl-derivative of cellulose or starch soluble in cold water.

VII. There is prepared a 5–10% solution of an ethyl-cellulose or an ethyl-starch, a benzyl-cellulose or a benzyl-starch soluble in oil and in 100 parts by weight of this solution are dissolved 10 parts by weight beta-naphthol or phenol or cresol. Then this solution is emulsified with 50 to 70 parts by weight of a 5% ethyl- or methyl-cellulose or ethyl- or methyl-starch soluble in water.

VIII. A 3–10% aqueous solution of a water-soluble ethyl- or methyl-cellulose or an ethyl- or methyl-starch is mixed with a solution of gold chloride or of some other soluble gold salt and then treated in known manner with hydrazinehydrate or hydroxyl-amine-chlor-hydrate, or some other suitable reducing agent. After completion of the reduction the colloidal gold solution is heated upon a water bath, during which not only the alkyl-cellulose or alkyl-starch precipitates but also with it the gold. The precipitate or coagulate is separated for example with a hot water funnel, from the mother liquor and thoroughly washed with warm or hot water. The washed out filter residue is then through cooling dissolved in water (for which purpose the water clinging to it or the amounts still to be added to it will serve) or dried. The drying can be preceded with a preliminary treatment with strong alcohol or alcohol and ether.

According to the coagulation method described in Example VIII one can produce colloid solutions of other metals or metalloids (as palladium, platinum, iridium, osmium, silver, mercury, copper, tin, sulphur, selenium, tellurium, and so on) by direct reduction or, if necessary by a reduction passing through the respective oxides and also colloid solutions (suspensions, emulsions) of metal compounds (oxides, haloids, carbonates and the like) by mutual reaction of the components in question in aqueous solutions of water-soluble alkyl-derivatives of carbohydrates $n\,(C_6H_{10}O_5)$. The coagulation method can also be used for making colloid solutions (emulsions, suspensions) of other inorganic or organic substances.

The expression "polysaccharides" in the specification as well as in the claims means: carbohydrates of the empirical formula $n\,(C_6H_{10}O_5)$ such as cellulose or its conversion products, or derivatives, starch, dextrine, inulin, carragheen, lichenin, and the like. The expression "ethers" means alkyl or aralkyl derivatives.

Claims:

1. Process of making materials in the collodial state which process comprises using, as protective colloids, ethers of polysaccharides.

2. Process of making colloidal suspensions which process comprises using, as protective colloids, ethers of polysaccharides.

3. Process of making materials in the colloidal state which process comprises using, as protective colloids, water-soluble alkyl ethers of polysaccharides.

4. Process of making colloidal suspensions which process comprises using, as protective colloids, water-soluble alkyl ethers of polysaccharides.

5. Process of making materials in the colloidal state which process comprises using, as protective colloids, ethers of polysaccharides in admixture with other protective colloids.

6. Process of making materials in the colloidal state which process comprises using, as protective colloids, water-soluble alkyl ethers of polysaccharides in admixture with other protective colloids.

7. Process of making collodial suspensions which process comprises using, as protective colloids, water-soluble alkyl ethers of polysaccharides in admixture with other protective colloids.

8. Process of making materials in the colloidal state which process comprises first heating an aqueous solution containing a water-soluble alkyl ether of a polysaccharide and an other substance in the collodial state, and then washing the precipitate thereby produced with hot water.

9. Process of making materials in the colloidal state which process comprises first heating an aqueous solution containing a water-soluble alkyl ether of a polysaccharide and a substance in colloidal suspension, then washing the precipitate thereby produced with a liquid in which it is not wholly soluble.

10. Process of making materials in the collodial state which process comprises first heating an aqueous solution containing a water-soluble alkyl ether of a polysaccharide, another protective colloid and a third substance in the colloidal state, then washing the precipitate thereby produced with hot water drying the precipitate, and finally dissolving the dried precipitate.

11. Process of making materials in the colloidal state which process comprises first heating an aqueous solution containing a water-soluble alkyl ether of a polysaccharide, another protective colloid and a substance in colloidal suspension, then washing the precipitate.

12. Process of making materials in the colloidal state which process comprises first heating an aqueous solution containing a water-soluble alkyl ether of a polysaccharide and another substance in the colloidal state, then washing the precipitate thereby produced with hot water, and finally drying the washed precipitate.

13. Process of making materials in the colloidal state which process comprises first heating an aqueous solution containing a water-soluble alkyl ether of a polysaccharide and a substance in colloidal suspension, then washing the precipitate thereby produced with hot water, and finally drying the washed precipitate.

14. Process of making materials in the colloidal state which process comprises first heating an aqueous solution containing a water-soluble alkyl ether of a polysaccharide, another protective colloid and a third substance in the colloidal state, then washing the precipitate thereby produced with hot water, and finally drying the washed precipitate.

15. Process of making materials in the colloidal state, which process comprises first heating an aqueous solution containing a water-soluble alkyl ether of a polysaccharide, another protective colloid and a substance in colloidal suspension, then washing the precipitate thereby produced with hot water, and finally drying the washed precipitate.

16. Process of making materials in the colloidal state which process comprises first heating an aqueous liquid containing a water-soluble alkyl ether of a polysaccharide, another protective colloid, and another substance in the colloidal state, then washing the precipitate thereby produced with hot water.

17. As a new product, a material in the colloidal state containing an ether of a polysaccharide and a suspensoid.

18. As a new product, a material in the colloidal state containing a water-soluble alkyl ether of a polysaccharide and a suspensoid.

19. As a new product, a material in the colloidal state containing an ether of a polysaccharide, another protective colloid and a suspensoid.

20. As a new product, a material in the colloidal state containing a water-soluble alkyl ether of a polysaccharide, another protective colloid and a suspensoid.

21. As a new product, a colloidal suspension in a solution of an ether of a polysaccharid.

22. As a new product, a colloidal suspension in a solution of a water-soluble alkyl ether of a polysaccharid.

23. As a new product, a colloidal suspension in a solution of an ether of a polysaccharid in admixture with another protective colloid.

24. As a new product, a colloidal suspension in a solution of a water-soluble alkyl ether of a polysaccharid, in admixture with another protective colloid.

25. As a new product, a colloidal material containing as ingredients thereof an ether of a polysaccharid and a suspensoid.

26. As a new product, a colloidal material containing as ingredients thereof a water-soluble alkyl ether of a polysaccharid and a suspensoid.

27. As a new product, a colloidal material containing as ingredients thereof an ether of a polysaccharid, another protective colloid and a suspensoid.

28. As a new product, a colloidal material containing as ingredients thereof a water-soluble alkyl ether of a polysaccharid, and another protective colloid and a suspensoid.

29. A process which comprises incorporating a cold-water-soluble ether of a carbohydrate having the formula $n\ (C_6H_{10}O_5)$ with a medicinal material.

30. A process which comprises incorporating a cold-water-soluble ether of cellulose with a medicinal material.

31. A process which comprises incorporating an aqueous liquid containing an ether of a carbohydrate, with a medicinal material, and heating the mixture.

32. A process which comprises heating an aqueous liquid carrying an ether of a carbohydrate which is soluble in cold water but not in hot water, and also containing a medicinal material, and undesired soluble substances, filtering hot and washing with a liquid which is a solvent of said undesired soluble substances.

33. A process which comprises precipitating a cold-water-soluble carbohydrate ether carrying a colloidal medicinal material, and washing the precipitate.

34. A process of making a colloidal product which comprises incorporating a material in a colloidal state with a protective colloid comprising an ether of a polysaccharid, and a vehicle.

35. A process of making a colloidal product which comprises incorporating a material in a colloidal state with a protective colloid comprising an ether of a polysaccharid, and a solvent.

36. A process of making a colloidal product which comprises incorporating a material in a colloidal state with a protective colloid comprising an ether of a polysaccharid, and water.

37. A process of making a colloidal product which comprises incorporating an inorganic material in a colloidal state with a protective colloid comprising an ether of a polysaccharid, and a vehicle.

38. A process which comprises heating an aqueous complex comprising an aqueous solution of an ether of a polysaccharid of low degree of etherification and other colloidal material, whereby both are thrown down, and washing the coagulate with a solvent of undesired constitutents.

In testimony whereof I have signed my name to this specification in the presence of two subscribing witnesses.

LEON LILIENFELD.

Witnesses:
HERMANN WUNDERLICH,
FRANZ SCHIANSKY.